United States Patent
Schmitt et al.

(10) Patent No.: US 10,697,075 B2
(45) Date of Patent: Jun. 30, 2020

(54) DUCT ASSEMBLY AND METHOD OF FORMING

(71) Applicant: Unison Industries, LLC, Jacksonville, FL (US)

(72) Inventors: Joseph Richard Schmitt, Springfield, OH (US); Donald Lee Templeton, Beavercreek, OH (US); Daniel Dyer, Dayton, OH (US); Emily Marie Phelps, Bellbrook, OH (US); Gordon Tajiri, Waynesville, OH (US)

(73) Assignee: Unison Industries, LLC, Jacksonville, FL (US)

( * ) Notice: Subject to any disclaimer, the term of this patent is extended or adjusted under 35 U.S.C. 154(b) by 65 days.

(21) Appl. No.: 15/940,277

(22) Filed: Mar. 29, 2018

(65) Prior Publication Data
US 2019/0301036 A1    Oct. 3, 2019

(51) Int. Cl.
| | |
|---|---|
| *F02C 7/14* | (2006.01) |
| *F02C 6/08* | (2006.01) |
| *C25D 1/02* | (2006.01) |
| *C25D 7/04* | (2006.01) |
| *C25D 1/00* | (2006.01) |
| *C25D 1/10* | (2006.01) |
| *C25D 5/56* | (2006.01) |
| *F16L 9/14* | (2006.01) |

(Continued)

(52) U.S. Cl.
CPC ............. *C25D 1/02* (2013.01); *B22F 5/009* (2013.01); *C25D 7/04* (2013.01); *F01D 25/12* (2013.01); *F02C 7/14* (2013.01); *F05D 2230/31* (2013.01); *F05D 2230/90* (2013.01); *F05D 2300/171* (2013.01)

(58) Field of Classification Search
CPC ... C25D 7/04; C25D 1/02; C25D 1/00; C25D 1/10; C25D 5/56; F02C 7/14; F02C 6/08; B22F 5/009; B22F 3/1055; B22F 3/225; F05D 2230/31; F05D 2230/90; F05D 2300/171; F05D 2230/21; F05D 2230/30; F05D 2230/22; F05D 2230/10; F01D 25/12; B33Y 10/00; B33Y 80/00; F16L 9/14
See application file for complete search history.

(56) References Cited

U.S. PATENT DOCUMENTS

| | | |
|---|---|---|
| 314,528 A | 3/1885 | Hardy |
| 315,628 A | 4/1885 | Jacobsen |

(Continued)

FOREIGN PATENT DOCUMENTS

| | | |
|---|---|---|
| EP | 1336810 A2 | 8/2003 |
| FR | 2331690 A1 | 6/1977 |
| GB | 2194552 A1 | 3/1988 |

*Primary Examiner* — Bayan Salone
(74) *Attorney, Agent, or Firm* — McGarry Bair PC

(57) ABSTRACT

Duct assembly and method of forming a duct assembly, the method including providing a preform body having an outer surface, disposing the preform body adjacent a sacrificial mandrel such that at least a portion of the preform body abuts an outer surface of the sacrificial mandrel, forming the duct assembly by depositing metal on the outer surface of the sacrificial mandrel and the preform body to define a unitary metallic tubular element with integral preform body and where depositing metal occurs at a temperature that does not damage the sacrificial mandrel, and removing the sacrificial mandrel to define the duct assembly.

23 Claims, 8 Drawing Sheets

(51) Int. Cl.
  *B22F 3/10*  (2006.01)
  *B22F 3/22*  (2006.01)
  *B33Y 10/00* (2015.01)
  *B33Y 80/00* (2015.01)
  *B22F 5/00*  (2006.01)
  *F01D 25/12* (2006.01)

(56) References Cited

U.S. PATENT DOCUMENTS

| | | | |
|---|---|---|---|
| 315,681 A | 4/1885 | Von Hollen | |
| 316,569 A | 4/1885 | Reynolds | |
| 317,921 A | 5/1885 | Brown | |
| 318,604 A | 5/1885 | Devereux | |
| 320,600 A | 6/1885 | Stoetzel | |
| 691,803 A | 1/1902 | Patton | |
| 1,282,269 A | 10/1918 | Merritt | |
| 1,694,962 A | 12/1928 | Berry | |
| 2,181,257 A | 11/1939 | Arbogast | |
| 2,287,122 A | 6/1942 | Norris | |
| 2,761,828 A | 9/1956 | Ginzton | |
| 3,022,230 A | 2/1962 | Fialkoff | |
| 3,308,879 A | 3/1967 | Maddocks | |
| 3,554,874 A | 1/1971 | Mattia | |
| 3,910,039 A | 10/1975 | Fortini | |
| 4,156,306 A | 5/1979 | Seidel | |
| 4,214,945 A | 7/1980 | Lucas | |
| 4,255,237 A | 3/1981 | Duerr | |
| 4,417,854 A | 11/1983 | Cain | |
| 5,293,922 A * | 3/1994 | Imai | C25D 1/02 164/132 |
| 5,698,086 A | 12/1997 | Herbert | |
| 6,582,542 B1 | 6/2003 | Russell | |
| 6,904,756 B2 | 6/2005 | Mack | |
| 7,712,789 B2 | 5/2010 | Heuer | |
| 8,636,485 B2 | 1/2014 | Steele | |
| 9,284,654 B2 | 3/2016 | Saucy | |
| 9,365,941 B2 | 6/2016 | Saucy | |
| 9,624,779 B2 | 4/2017 | Yan | |
| 2008/0078554 A1 * | 4/2008 | Huff | B23K 9/18 166/363 |
| 2010/0086425 A1 * | 4/2010 | Steele | C25D 1/02 418/48 |
| 2011/0062112 A1 | 3/2011 | Saucy | |
| 2014/0202170 A1 * | 7/2014 | Cook, III | F02C 7/04 60/805 |
| 2015/0096631 A1 | 4/2015 | Casey | |
| 2015/0106062 A1 * | 4/2015 | Chen-Keat | G06F 17/50 703/1 |
| 2015/0370923 A1 * | 12/2015 | Chen-Keat | G06F 17/50 703/1 |
| 2016/0003257 A1 | 1/2016 | Bianchi | |
| 2016/0281532 A1 | 9/2016 | Rambo | |
| 2016/0312614 A1 | 10/2016 | Kinstler | |
| 2017/0291214 A1 | 10/2017 | Roberge | |
| 2018/0320801 A1 * | 11/2018 | Yang | B23P 15/00 |

* cited by examiner

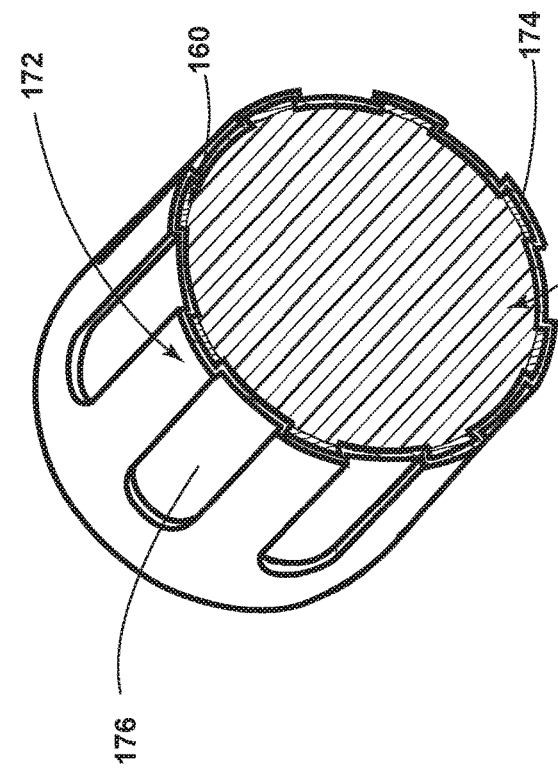
FIG. 5A
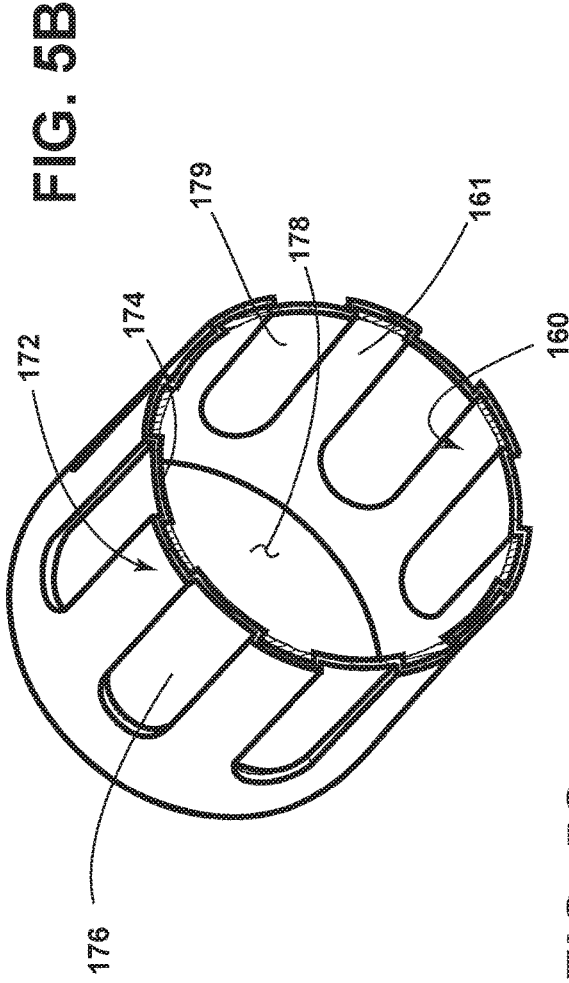
FIG. 5B
FIG. 5C

DUCT ASSEMBLY AND METHOD OF FORMING

BACKGROUND

Contemporary engines used in aircraft can include fluid passageways for providing flow from a fluid source to a fluid destination. In one non-limiting example, a bleed air system can receive pressurized bleed air from a compressor section of an engine and convey to a fluidly downstream component or system, such as an environmental control system. Additional fluid passageways can be utilized for carrying, transferring, or otherwise flowing fluid including, but not limited to, oil, coolant, water, fuel, or the like. In the example of an aircraft engine, the passageways can be exposed to high pressures, high temperatures, stresses, vibrations, thermal cycling, and the like. The passageway, or other component formed in a similar process, can be configured, designed, or arranged to provide reliable operation in the functional environment. The complexity and spacing requirements of the turbine engine often require particular ducting paths and structural attachments to the engine case in order to accommodate other engine components and maintain appropriate safety margins for the duct. However, duct assemblies and conduits thereof are limited by manufacturing capabilities and costs, which can lead to increased weight or inefficient duct assemblies.

BRIEF DESCRIPTION

In one aspect, the disclosure relates to a method of forming a duct assembly, the method comprising providing a preform body having an outer surface, disposing the preform body adjacent a sacrificial mandrel such that at least a portion of the preform body abuts an outer surface of the sacrificial mandrel, forming the duct assembly by depositing metal on the exposed outer surface of the sacrificial mandrel and the preform body to define a unitary metallic tubular element with integral preform body and where depositing metal occurs at a temperature that does not damage the sacrificial mandrel, and removing the sacrificial mandrel to define the duct assembly.

In another aspect, the disclosure relates to a duct assembly, comprising a preform sleeve body having an interior surface and an exterior surface; and a duct section comprising a metal layer forming an exterior surface, the duct section defining a fluid passageway and where the metal layer is unitarily formed with the preform sleeve body.

BRIEF DESCRIPTION OF THE DRAWINGS

In the drawings:

FIG. 5A is a perspective view of an exemplary preform that can be utilized in the duct assembly of FIG. 1.

FIG. 5B is a cut-away perspective view of a partially-formed duct assembly of FIG. 1 including a sacrificial mandrel and the exemplary preform of FIG. 5A.

FIG. 5C is a cut away perspective view of the duct assembly formed in FIG. 5B with the sacrificial mandrel removed.

DETAILED DESCRIPTION

Figure 1:
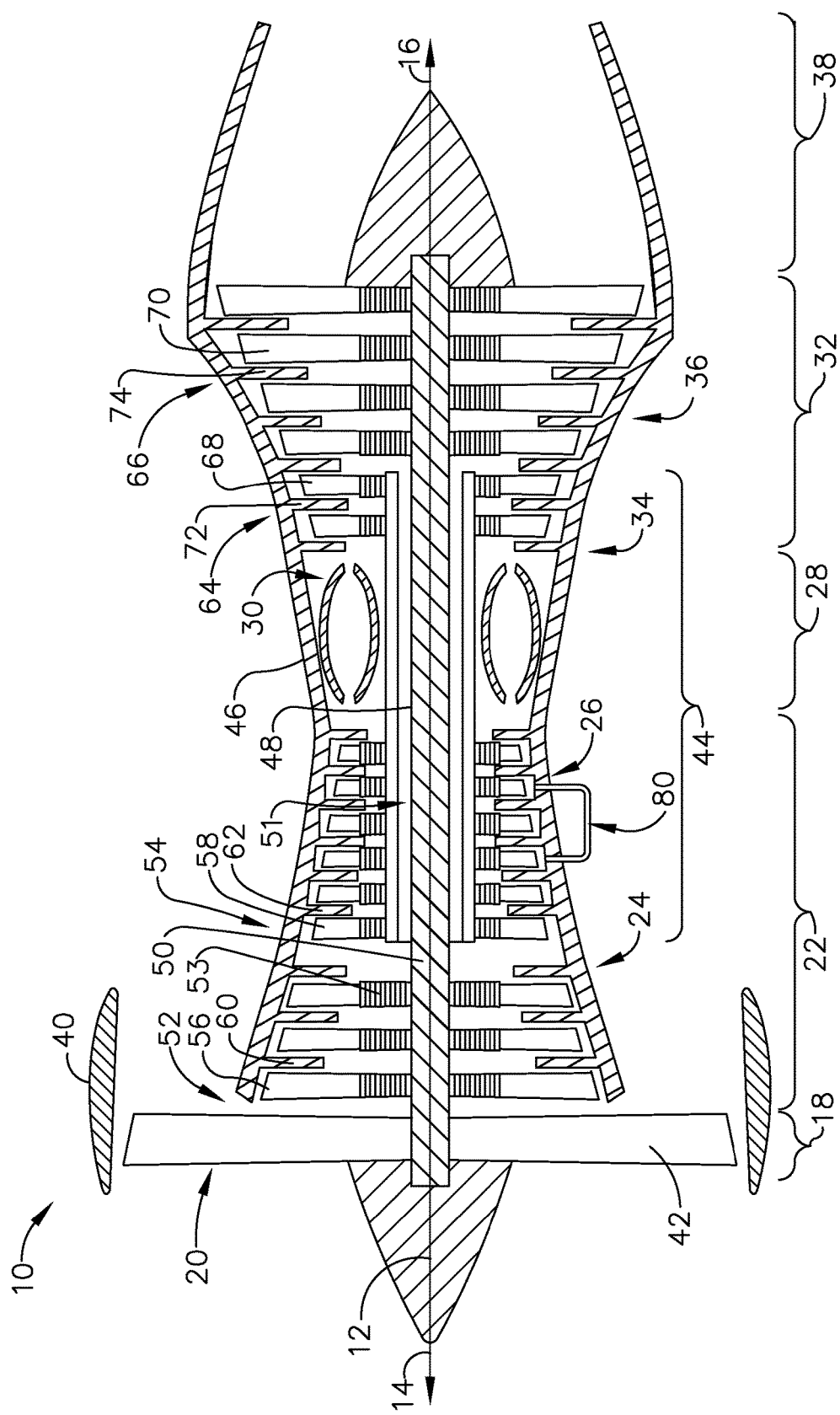
FIG. 1 is a schematic cross-sectional view of a gas turbine engine with a duct assembly in accordance with various aspects described herein.

Aspects of present disclosure are directed to a duct assembly, ducting, or conduit for providing a flow of fluid. Such duct assembly can be configured to provide a fluid flow from one portion of an engine to another. For purposes of illustration, the present disclosure will be described with respect to a gas turbine engine. Gas turbine engines have been used for land and nautical locomotion and power generation, but are most commonly used for aeronautical applications such as for airplanes, including helicopters. In airplanes, gas turbine engines are used for propulsion of the aircraft. It will be understood, however, that the disclosure is not so limited and can have general applicability in non-aircraft applications, such as other mobile applications and non-mobile industrial, commercial, and residential applications. Additionally, the described embodiments will have equal applicability to any ducting system experiencing high system loading or large thrust and shear loads requiring a flex joint to connect elements.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline. Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. As used herein, "sacrificial" can refer to an element, component, or material composition that can be removed. Non-limiting examples of "sacrificial" elements can include a melt-able composition such as wax or plastic, a low melting temperature alloyed metal, or a dissolvable composition. In this sense, the "sacrificial" element can be removed by way of melting when exposed to a heating element, or dissolved when exposed to a dissolving agent. Additional or alternative non-limiting aspects of sacrificial element removal can be included, such as mechanical disassembly, or physically removing elements or sub-elements.

The exemplary drawings are for purposes of illustration only and the dimensions, positions, order, and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending from forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a set of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a set of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, respectively, with stages having their own disks. The vanes 60, 62 are mounted to the core casing 46 in a circumferential arrangement about the rotor 51.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the air from the compressor section 22 can be bled off via one or more duct assemblies 80, and be used for cooling of portions, especially hot portions, such as the HP turbine 34, or used to generate power or run environmental systems of the aircraft such as the cabin cooling/heating system or the deicing system. In the context of a turbine engine, the hot portions of the engine are normally downstream of the combustor 30, especially the turbine section 32, with the HP turbine 34 being the hottest portion as it is directly downstream of the combustion section 28. Air that is drawn off the compressor and used for these purposes is known as bleed air.

Additionally, the ducts, or metal tubular elements thereof, can also be a fluid delivery system for routing a fluid through the engine 10, including through the duct assemblies 80. The duct assemblies 80, such as air duct or other ducting assemblies leading either internally to other portions of the turbine engine 10 or externally of the turbine engine 10, can also include one or more metal tubular elements or metallic tubular elements forming ducts or conduits configured to convey fluid from a first portion of the engine 10 to another portion of the engine 10.

Figure 2A:
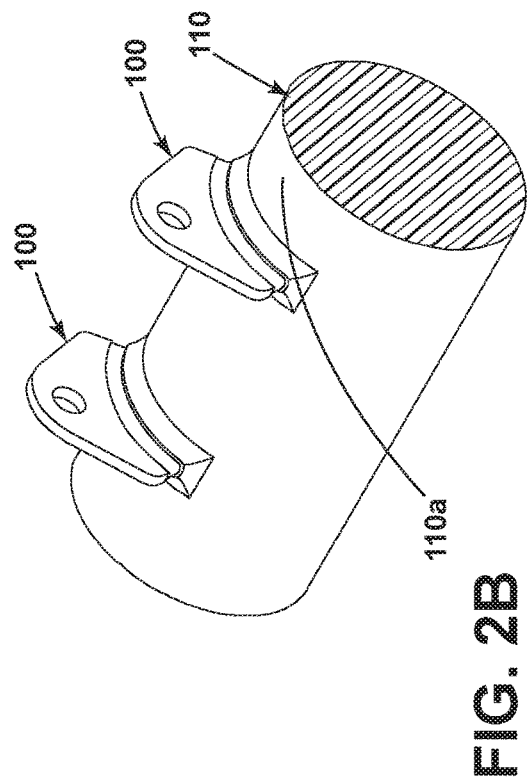
FIG. 2A is a perspective view of an exemplary preform that can be utilized in the duct assembly of FIG. 1.

Turning to FIG. 2A, an exemplary preform 100 is illustrated that can be utilized in the duct assembly 80 of FIG. 1. In the illustrated example, the preform 100 includes a bracket body 102 having an exterior surface 104 and a base portion 106 forming a footprint 106a. The base portion 106 can be curved such that the footprint 106a can be seated on a curved surface. Although it will be understood that this need not be the case. Further, the bracket body 102 includes an aperture 108 illustrated as substantially circular, although it will be understood that other profiles may also be utilized such as square, rounded, or irregular. The apertures 108 can be configured to receive fasteners such as bolts or screws such that the bracket body 102 can be configured to attach or otherwise fasten to a portion of the aircraft engine 10 of FIG. 1. In this manner, the preform 100 can take any suitable form utilized for positioning, attaching, or otherwise locating, a portion of the duct assembly 80. In the non-limiting example, the preform 100 can be made of any suitable material for the environment, including sheet metal, steels, nickel alloys, or aluminum alloys. Alternatively, the preform 100 can be utilized to provide strength, rigidity, reliability, resilience, or the like. The preform 100 can be formed in a variety of methods, including laser-cutting, additive manufacturing, machining, or machine casting, in non-limiting examples.

Figure 2B:
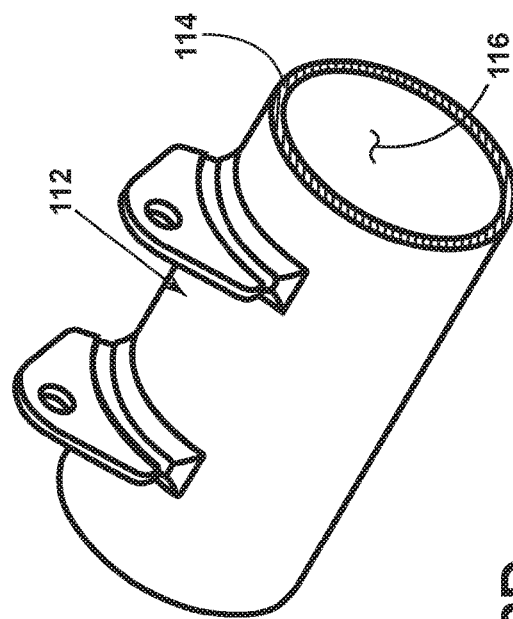
FIG. 2B is a perspective view of a sacrificial mandrel and exemplary preforms of FIG. 2A.

FIG. 2B illustrates the preform 100 position and located to a sacrificial mandrel 110. The sacrificial mandrel 110 is utilized in forming a conduit section of at least a portion of the duct assembly 80. The sacrificial mandrel 110 itself can be formed via additive manufacturing, injection molding, or any other suitable process and has been illustrated as including a curved outer surface 110a although it will be understood that the mandrel can include any suitable profile, shape, or dimensions. The sacrificial mandrel 110 can include, by way of non-limiting examples, materials such as plastics/polymers, wax, aluminum, or other low melting point metals.

Figure 2C:
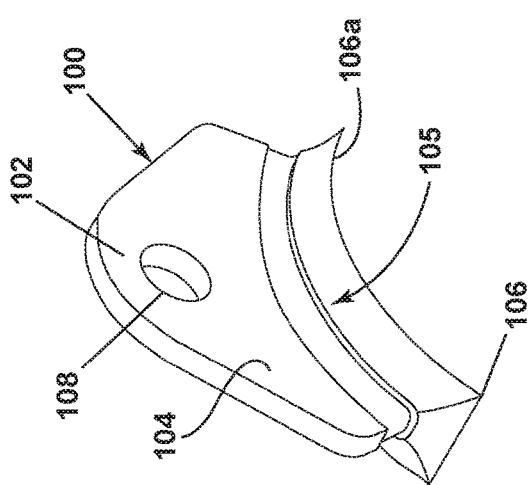
FIG. 2C is a perspective view of a partially-formed duct assembly of FIG. 1 including the sacrificial mandrel and preforms of FIG. 2B.

The preform 100 can be disposed, positioned, configured, or arranged relative to at least one portion of the sacrificial mandrel 110 including a curved portion of the outer surface 110a thereof. In one non-limiting example, the base portion 106 of the preform body 100 can abut at least a portion of the outer surface 110a of the sacrificial mandrel 110. The preform 100 can be contoured, shaped, keyed, configured, or the like, such that the entire footprint 106a abuts the outer surface 110a of the sacrificial mandrel 110. Aspects of the disclosure can be included wherein the preform body 100 can be disposed relative to, located, or arranged proximate to a pre-identified high stress area of the partially-formed duct assembly 112 (FIG. 2C). For example, if the sacrificial mandrel is not formed directly to the preform it is contemplated that the preform and sacrificial mandrel can be attached in any suitable manner such as via adhesive.

FIG. 2C illustrates a partially formed duct assembly 112 formed about the preforms 100 and the sacrificial mandrel 110. More specifically, an electroforming process can create a metallic layer 114 over the preform 100 and sacrificial mandrel 110. All exposed surfaces of the preform 100 and sacrificial mandrel 110 can be covered by the metallic layer 114. It is further contemplated that any desired portion of the exposed surfaces of the preform and sacrificial mandrel can be covered by a metallic layer. In one non-limiting example, a metallic layer can be deposited over all exposed surfaces of the mandrel and only a portion of the preform, such as by shielding a portion of the preform during an electroforming process. In this manner the deposited metallic layer can fully cover the sacrificial mandrel and partially enclose the preform. Other examples in the spirit of the present disclosure are contemplated for use.

As used herein, "electroforming" or "electrodeposition" can include any process for building, forming, growing, or otherwise creating a metallic layer over another substrate or base. Non-limiting examples of electrodeposition can include electroforming, electroless forming, electroplating, or a combination thereof. While the remainder of the disclosure is directed to electroforming, any and all electrodeposition processes are equally applicable. In one non-limiting example of an electroforming process, the preforms 100, and sacrificial mandrel 110 of FIG. 2B can be submerged in an electrolytic liquid and electrically charged. The electric charge of the preforms 100 and sacrificial mandrel 110 can attract an oppositely charged electroforming material through the electrolytic solution. The attraction of the electroforming material to the exposed surfaces of preforms 100 and sacrificial mandrel 110 ultimately deposits the electroforming material on the exposed surfaces to form the duct assembly 112, creating the metallic layer 114. Thus, the electroforming process can be utilized to form the duct assembly 112.

In non-limiting examples, electroforming material can include nickel and nickel alloys, iron and iron alloys, or the like, or a combination thereof. In another non-limiting example, at least a portion of the exposed surfaces of the preforms 100 and sacrificial mandrel 110 can include a metalized layer prior to the electroforming process.

Figure 2D:
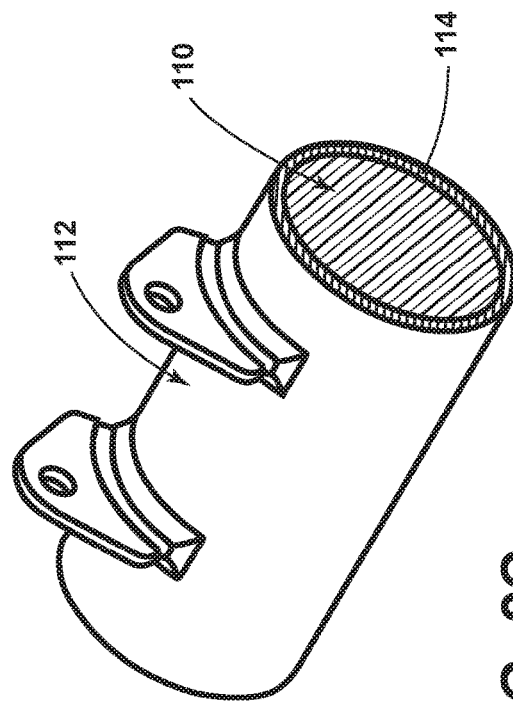
FIG. 2D is a perspective view of the duct assembly formed in FIG. 2C with the sacrificial mandrel removed.

The sacrificial mandrel 110 can then be removed by application of heat or a chemical flush in non-limiting examples. In this manner, the duct assembly 112 having a fluid passage 116 can be formed as illustrated in FIG. 2D. The metallic layer 114 and the preforms 100 (FIG. 2B) completely fuse during the electroforming thus providing the duct assembly itself with structural integrity.

By locating the preform 100 on the sacrificial mandrel 110 prior to electrodeposition a load bearing structure, thicker metal, or an additional insert can be included where needed. In the illustrated example, the preform 100 allows for bracket structural attachment features in the middle of the duct run. The footprint 106a of the preform 100 can be designed to reduce and distribute stresses to the electroformed metallic layer 114. By bracketing in the duct run, any unwanted mode shapes from the high cycle vibration can be eliminated by structural attaching the duct assembly on the engine. The additional attachment can provide adequate stiffness to the duct assembly and increase the assembly's natural mode shape frequency out of the engine excitation range. This in turn can reduce or eliminate unwanted stresses.

It should be appreciated that the duct assembly 112 as shown can represent only a portion of the duct, and can be shorter or longer, including more or different profiles, thicknesses, turns, or cross-sectional areas. It should be further appreciated that any duct described herein, can include a variable thickness along one or more portions of the duct. The variable thickness can have increased thicknesses locally to increase strength or durability of the duct, such as at portions encountering heightened operational temperatures or stresses, or at turns along the duct. Such variable thicknesses can provide for a duct having variable thermal or mechanical properties. For example, a duct having an increased thickness can provide for improved structural integrity in order to operate under heightened stresses or loads. In another example, the duct can have a decreased thickness, which can provide for improved heat transfer along the duct. Such an implementation may be beneficial in the use of heat exchangers. Furthermore, the variable profiles and thicknesses can include dimples, or structures that can enhance thermal transfer of the fluid at the duct. For example, the variable profile can include helical ribs to turbulate a fluid travelling within or around the duct. Additionally, the variable thickness can also include lesser thicknesses to decrease engine weight, or even increase local convective transfer. Additionally, it should further be appreciated that the duct assembly can include any suitable type of varying profile. Such a varying profile can include different profile shapes, different cross-sectional areas, different thicknesses, or a combination thereof. The varying profiles can improve local strength, can be adapted based upon local thermal needs, or can be adapted to fit into crowded areas of the engine.

It will be understood that the preform can be a preform body used, among other areas, at high stress areas. As used herein, a "high stress area" can refer to an area or a portion of the duct assembly expected, designed, or intended to experience higher stress compared with non-high-stress portions of the duct assembly. For instance, the high stress area can be a result of the geometric configuration of the duct assembly, or connections thereto. Non-limiting examples of stress can include vibration, torque, pressure, thermal cycling, or the like, and can be based at least partially on an operating environment of the duct assembly. The stress can affect the duct assembly, resulting in, for example, component failure, fatigue, deformation, damage, or the like. The stress can affect the duct assembly instantaneously during duct assembly operations, or over an elongated period of time. In this sense, a "high stress area" can include a position or location that can to fail due to stresses experienced. Aspects of the disclosure can be included wherein the disposing of the preform proximate or relative to the high stress area can provide structural support or integrity to counter the stresses experienced at the high stress area. Stated another way, the preform enables, provides for, or allows the duct assembly to be better suited to resist failure at the high stress area.

Figure 3A:
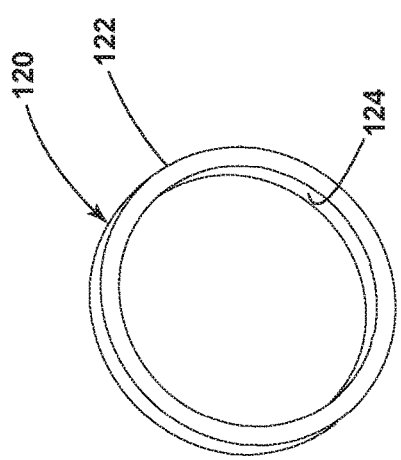
FIG. 3A is a perspective view of an exemplary preform that can be utilized in the duct assembly of FIG. 1.

FIG. 3A illustrates an exemplary preform that can be utilized in a predetermined high stress area according to another aspect of the present disclosure. The preform 120 and sacrificial mandrel 130 (FIG. 3B) are similar to those previously described with it being understood that the description of the like parts applies to the preform 120 and sacrificial mandrel 130 unless otherwise noted.

Figure 3B:
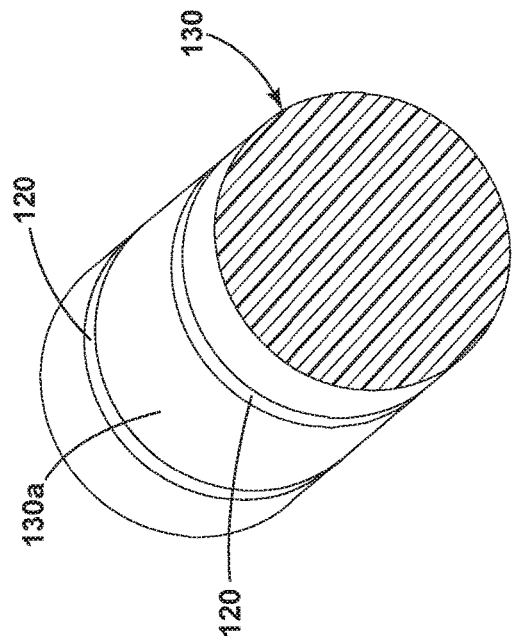
FIG. 3B is a perspective view of a sacrificial mandrel and exemplary preforms of FIG. 3A.

One difference is that the preform 120 is a ring having an exterior diameter 122 and an interior diameter 124. FIG. 3B illustrates that the preforms 120 can be disposed on the sacrificial mandrel such that the exterior diameter 122 is flush with the outer surface 130*a* of the sacrificial mandrel 130. By way of non-limiting example, this can be achieved by injection molding the sacrificial mandrel 130 into the preforms 120. Alternatively, the preform 120 can be thought of as including an aperture that the sacrificial mandrel is disposed within.

Figure 3C:
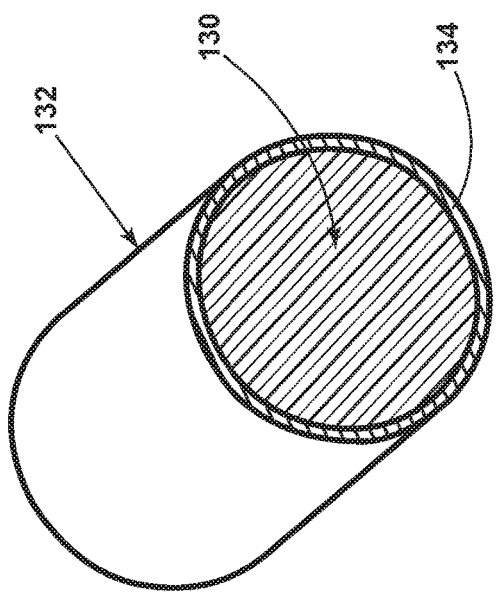
FIG. 3C is a perspective view of a partially-formed duct assembly of FIG. 1 including the sacrificial mandrel of FIG. 3B.
Figure 3D:
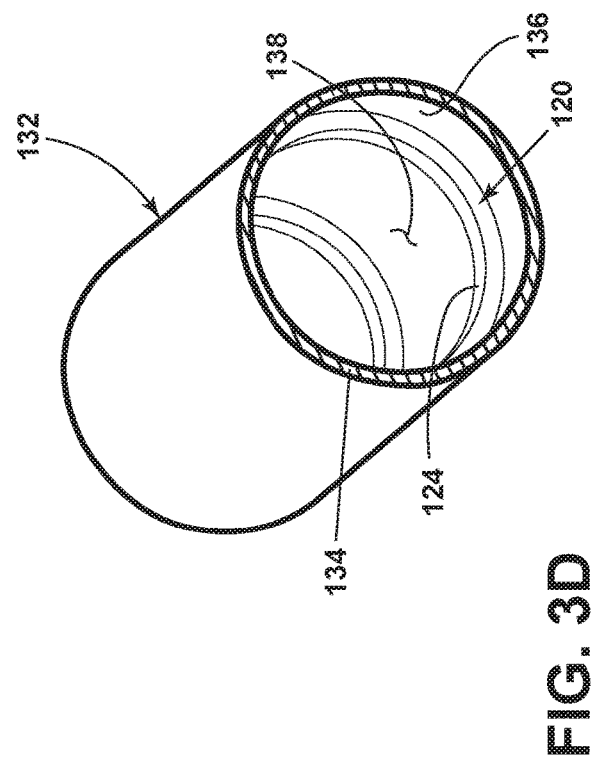
FIG. 3D is a perspective view of the duct assembly formed in FIG. 3C with the sacrificial mandrel removed.

FIG. 3C illustrates that a metallic layer 134 has been formed over the exposed surfaces of the preforms 120 and the sacrificial mandrel 130. As described above this can be accomplished via electrodeposition. After the forming of the metallic layer 134, the sacrificial mandrel 130 can be "sacrificed" or removed. This in turn fully forms the duct assembly 132 as illustrated in FIG. 3D. The duct assembly 132 includes an integral or unitary monolithic body that includes only the preforms 120 and the electroformed metallic layer 134. Both a first surface 136 of the metallic layer, which would have been adjacent the sacrificial mandrel 130 and the inner diameter 124 of the preforms 120 form the fluid passageway 138 of the duct assembly 132. Because of the manner in which the preforms 120 were set into the outer surface 130*a* of the sacrificial mandrel 130 the preforms extend into the fluid passageway 138 and can affect fluid flow therein.

As shown, the electroforming process can be selected, controlled, or the like, to ensure at least a minimal electroformed material thickness over each exposed surface of the preforms 120 and sacrificial mandrel 130 (FIG. 3B). Also as shown, the electroformed material thickness can be less than the preform body thickness. In this sense, the primary structural support at the high stress area can be provided by the preform body, as opposed to the electroformed metallic layer 134, which the electroformed metallic layer 134 can provide the primary structural support for the non-high-stress areas. Thus, non-limiting aspects of the disclosure can be included wherein the electroforming material, or the electroformed material thickness is selected based on desired operating aspects of the duct assembly 132, including but not limited to, pressure, fluid type, fluid temperature, the like, or a combination thereof. Likewise, non-limiting aspects of the disclosure can be included wherein the preform body or preform body thickness can be selected based on the same electroformed material considerations or the expected stresses described herein, or a combination thereof.

It will be understood that the use of the straight edge interface can, in some instances, result in a higher current density during the electroforming process, producing a greater electroformed metallic layer thickness area proximate to the edge. Thus, aspects of the disclosure can be included wherein the edges can be configured, selected, or the like, to include beveled, blended, or radial insert edges configured or selected to ensure a uniform expected electroformed metallic layer. As a step or ledge between the electroformed metallic layer and the preform is undesirable the preform can include a transitional surface or edge providing a smooth transition between one of its sides and the surface of the sacrificial mandrel. "Smooth transition" as used herein will refer to a layer thickness decreasing toward zero in a direction toward a distal edge of the structure. In this manner, the preform can have a portion that is flush with the curved surface of the sacrificial mandrel. The transitional surface or smooth transition can also be referred to in the art as a knife edge. The tapering of the body allows the preform to more seamlessly be formed with the metallic layer in order to smoothly direct stresses between electroformed part and the preform. This makes the final part more durable as a result.

Figure 4A:
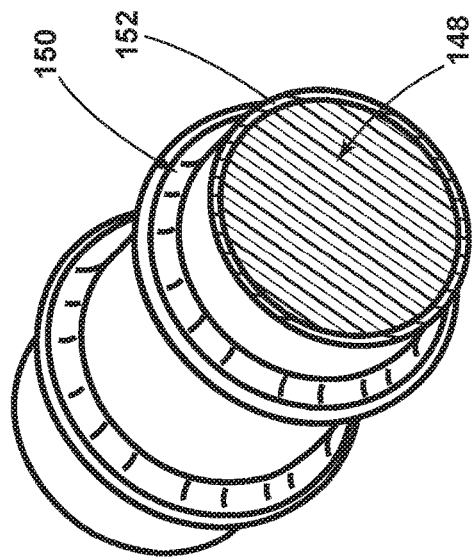
FIG. 4A is a perspective view of an exemplary preform that can be utilized in the duct assembly of FIG. 1.
Figure 4B:
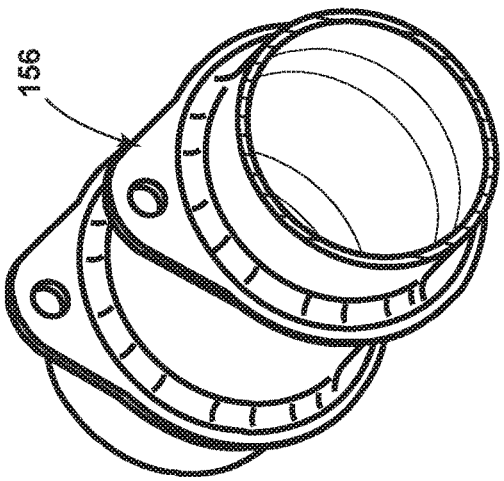
FIG. 4B is a perspective view of a partially-formed duct assembly of FIG. 1 including exemplary preforms of FIG. 4A and a sacrificial mandrel.
Figure 4C:
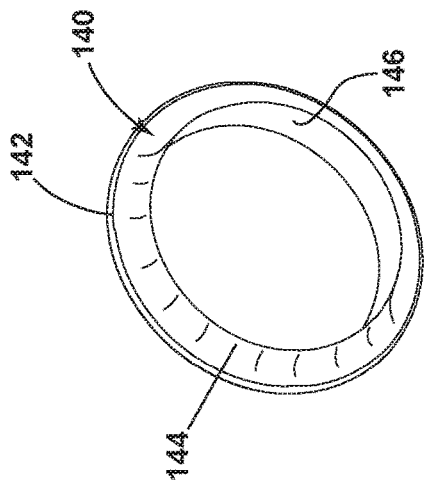
FIG. 4C is a perspective view of the duct assembly formed in FIG. 4B with the sacrificial mandrel removed.

FIG. 4A illustrates another preform that can be utilized in a duct assembly according to another aspect of the present disclosure. The preform 140 is similar to the preform 120 with it being understood that the description of the like parts applies to preform 120, unless otherwise noted. For example, the preform 140 is also a ring having an interior diameter 146. One difference is that the exterior includes a first diameter 144 and a projection 142 defining a second exterior diameter. The preform 140 also has more beveled transitions, allowing for more seamless deposition over the preform 140 and the exposed surfaces in the sacrificial mandrel 148 of FIG. 4B. As can be seen in FIG. 4C the metallic layer 152 and the preforms 140 form the duct assembly 150 having the fluid passageway 154. One difference is that the preforms 140 do not extend into the fluid passageway 154. Instead more of a straight pipe wall or cylindrical shape is formed.

Figure 4D:
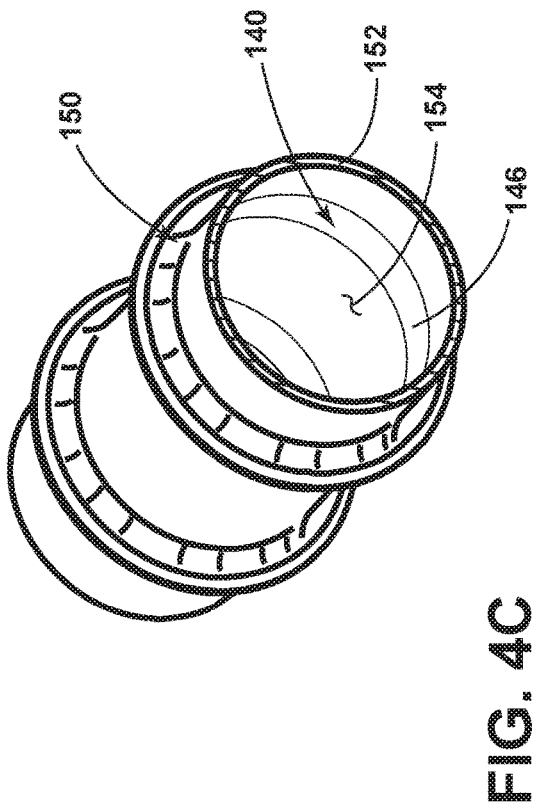
FIG. 4D is a perspective view of a similar duct assembly formed with exemplary preforms having an extended bracket portion with the sacrificial mandrel removed.

FIG. 4D illustrates another duct assembly 156 according to another aspect of the present disclosure. The duct assembly 156 is similar to the duct assemblies 132 and 150; therefore, it will be understood that the description of the duct assemblies 132 and 150 applies to the duct assembly 156, unless otherwise noted. One difference is that the duct assembly 156 has been formed to have a unitary bracket like extension. The preform utilized could have included such a bracket like extension from the ring body before being included in the unitary monolithic duct assembly 156. In such an example even more of the outer surface of the preform body would have extended from the outer surface of the sacrificial mandrel prior to electroforming.

FIG. 5A illustrates another exemplary preform that can be utilized in a predetermined high stress area according to another aspect of the present disclosure. The preform 160 and sacrificial mandrel 170 (FIG. 5B) are similar to those previously described with it being understood that the description of the like parts applies to the preform 160 and sacrificial mandrel 170 unless otherwise noted.

One difference is that the preform 160 is a sleeve having a body with an interior surface 161 and an exterior surface 162 extending along a longer length than the rings previously described. In the illustrated example, the preform 160 further includes a set of apertures 164. The set of apertures 164 extend about a circumference of the body of the preform 160. Each aperture 164 extends between the interior surface 161 and the exterior surface 162. While this need not be the case each aperture 164 has the same length, width, and general contour, profile, or shape.

FIG. 5B illustrates that the preforms 160 can be disposed about the sacrificial mandrel 170 such that the interior surface 161 contacts an outer surface of the sacrificial mandrel 170. In this manner, the preform 160 can be thought of as including a central aperture formed by the interior surface 161 that the sacrificial mandrel 170 is disposed within.

FIG. 5B also illustrates that a metallic layer 174 has been formed over the exposed surfaces of the preforms 160 and the sacrificial mandrel 170. As described above this can be accomplished via electrodeposition. This includes that the metallic layer 174 is formed over sacrificial mandrel 170 over the set of apertures 164 as shown at portion 176.

After the forming of the metallic layer 174, the sacrificial mandrel 170 can be "sacrificed" or removed. This in turn fully forms the duct assembly 172 as illustrated in FIG. 5C. The duct assembly 172 includes a unitary monolithic body that includes only the preform 160 and the electroformed metallic layer 174. If the metallic layer 174 is formed with a consistent thickness it forms valleys at the portions 176 where it was adjacent the sacrificial mandrel 170 and hills where it is over the preform 160. Both the interior surface 161 of the preform 160 and the interior surface 179 of the metallic layer form the fluid passage 178 of the duct assembly 172.

Figure 6:
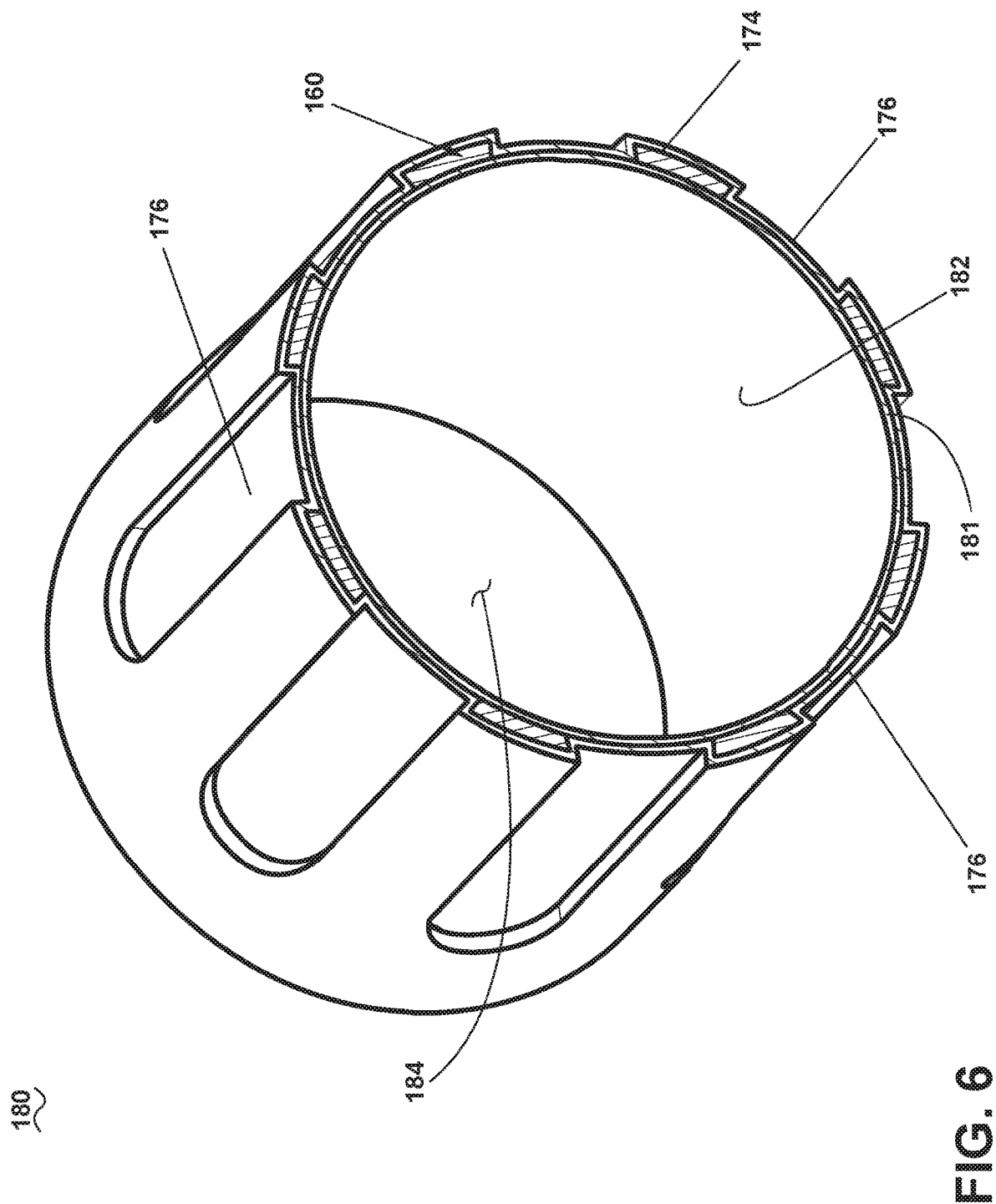
FIG. 6 is a perspective view of another exemplary duct assembly of FIG. 1.

FIG. 6 illustrates another duct assembly 180 according to another aspect of the present disclosure. The duct assembly 180 is similar to the duct assembly 172. The same numerals have been utilized for like parts and it will be understood that the description above applies to the duct assembly unless otherwise noted. One difference is that a metallic layer 181 has been included on the interior surface of the preform 160 and the metallic layer 174. The metallic layer 181 defines an interior surface 182 and the fluid passage 184 for the duct assembly 180. It is contemplated that such internal metallic layer 181 could have originally been deposited on the sacrificial mandrel prior to providing the preform 160 or that the metallic layer 181 could have been included after removal of the sacrificial mandrel 170.

Figure 7:
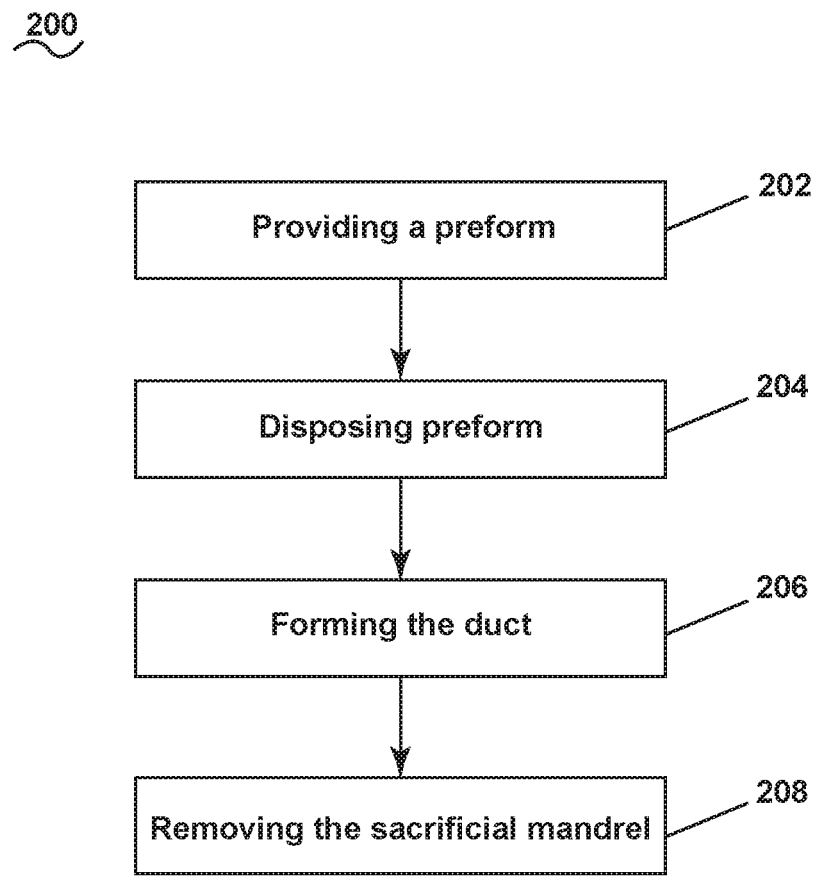
FIG. 7 is an example a flow chart diagram demonstrating a method for forming the duct assembly of FIG. 1.

FIG. 7 illustrates a flow chart demonstrating a method 200 of forming a duct assembly, such as the duct assembly 112, 132, 150, 156, 172, 180 described above. The method 200 begins at 202 providing the preform body. Non-limiting examples of preform bodies have been illustrated above as a sleeve, a bracket, a ring, or a stress insert although it will be understood that alternative bodies are contemplated. The preform can also be formed from any suitable material including that it may be any suitable metal including nickel, nickel alloy, or steel. It is contemplated that the providing the preform body can further include forming the preform and that this may include, by way of non-limiting examples, at least one of additively manufacturing the preform body, milling the preform body, casting the preform body, or machining the preform body.

At 204, the preform 100, 120, 140, 160 is disposed such that a portion of the preform 100, 120, 140, 160 abuts the outer surface of the sacrificial mandrel 110, 130, 148, 170. If the preform includes a transitional surface this includes interfacing the translation surface with the sacrificial mandrel 110, 130, 148, 170. It is contemplated that the method can optionally include forming the sacrificial mandrel 110, 130, 148, 170 via additive manufacturing, or injection or gravity molding.

The method 200 then proceeds to forming the duct assembly 112, 132, 150, 156, 172, 180 by way of electrodeposition of a metallic layer 114, 134, 152, 174, 181 over the exposed surface of the sacrificial mandrel 110, 130, 148, 170, and the exposed preform 100, 120, 140, 160 outer surface at 206. The material forming the preform 100, 120, 140, 160 then becomes integral with the plating at the atomic level avoiding stress risers or material softening in the tubular element or duct wall that might occur during conventional weld or braze operations. It will be understood that while all of the above examples include depositing metal on the outer surface of the sacrificial mandrel and the preform body comprises fully enclosing an outer surface of the preform body, that this need not be the case. For example, it is also contemplated that the preform body can be partially enclosed by deposited metal. Finally, the method 200 includes removing the sacrificial mandrel 110, 130, 148, 170 from the duct assembly 112, 132, 150, 156, 172, 180 as described herein, at 208.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method. For example, the method 200 can optionally include identifying a high stress area for the duct assembly of tubular element being formed around the sacrificial mandrel prior to the disposing of the preform body or disposing a preform body having at least one of a beveled, blended, or radial insert edges. In another non-limiting example, the method 200 can include forming the duct, conduit, or tubular element by way of a set or series of metallic layers. In yet another non-limiting example of the method 200 can include metalizing the exposed sacrificial material, the preform body, or a combination thereof prior to the electrodeposition process. Further still, the method 200 can include forming a metallic layer on the sacrificial mandrel, disposing the preform body adjacent the formed metallic layer and forming another layer over the exposed surfaces of the metallic layer and the preform body.

It is also contemplated that the depositing metal occurs at a temperature that does not damage the sacrificial mandrel. In a non-limiting example wherein the sacrificial mandrel is made of a wax material, the depositing metal can occur at a temperature below that of the wax material's melting point.

Figure 8:
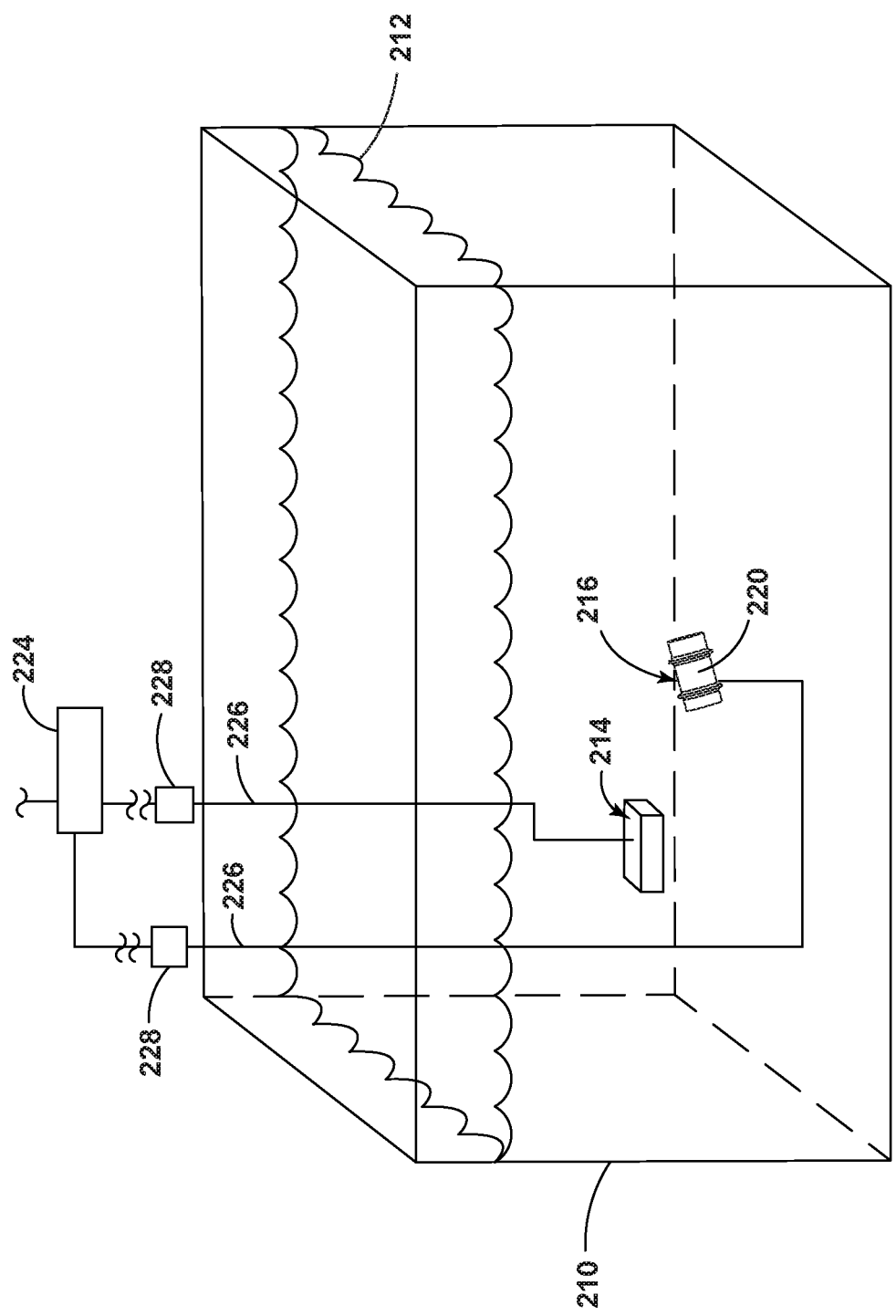
FIG. 8 illustrates an electroforming bath for forming the duct assembly of FIG. 1.

The electroforming process is illustrated by way of an electrodeposition bath in FIG. 8. An exemplary bath tank 210 carries a single metal constituent solution 212. The single metal constituent solution 212, in one non-limiting example, can include nickel alloy carrying alloying metal ions.

An anode 214 spaced from a cathode 216 is provided in the bath tank 210. The anodes 214 can be sacrificial anodes or an inert anode. While one anode is shown, it should be understood that the bath tank 210 can include any number of anodes 214 as desired. The duct assembly 220, including the mandrel 110, 130, 148, 170 and preform 100, 120, 140, 160, can form the cathode 216, having electrically conductive material. It is also contemplated that a conductive spray or similar treatment can be provided to the duct assembly 220, mandrel 110, 130, 148, 170, or preform 100, 120, 140, 160, to facilitate formation of the cathode 216. In addition, while illustrated as one cathode 216, it should be appreciated that one or more cathodes are contemplated for use in the bath tank 210.

A controller 224, which can include a power supply, can electrically couple to the anode 214 and the cathode 216 by electrical conduits 226 to form a circuit via the conductive metal constituent solution 212. Optionally, a switch 228 or sub-controller can be included along the electrical conduits 226, between the controller 224 and the anodes 214 and cathode 216. During operation, a current can be supplied from the anode 214 to the cathode 216 to electroform a monolithic body at the duct assembly 220, including the mandrel 110, 130, 148, 170 and preform 100, 120, 140, 160. During supply of the current, nickel or nickel alloy from the single metal constituent solution 212 form a metallic layer, such as the metallic layers described above to form a duct assembly having a preform that includes a unitary monolithic body. The process described allows for electroforming sections with thicker material by using the preform bodies, this in turn places material in the areas with the highest stress allowing for optimized weight control. The preform bodies can expedite the electroforming process allowing less time in the bath tank to achieve the desired thicknesses. Faster runs in the bath tank in turn result in lower cost. Stress risers associated with attachment hardware, mounting holes, rivets in sheet metal doublers would be eliminated.

Many other possible embodiments and configurations in addition to that shown in the above figures are contemplated by the present disclosure. One advantage that can be realized is that the above described aspects have superior structural strength at critical areas, while reducing the total amount of electrodeposited materials or mass at non-critical areas of the duct assembly. A reduction in the total amount of electrodeposited materials or mass reduces the mass of the overall assembly without compromising the integrity of the electrodeposited component. This is particularly advantageous in an aircraft environment where weight is directly tied to efficiency of the aircraft and fuel consumption. Another advantage over comparable elements or methods is that the above described aspects do not require brazing, welding, or doubling plates to reinforce or support the electroformed element, further reducing weight. The preform bodies allow for added thickness in electroformed parts such as conduits including in the highly stressed areas of an electroformed conduit. Further, the preform bodies allow for added thickness where it might be needed for welding or machining secondary operations. Further still, the preform bodies can be utilized as additional attachment points to add stiffness to tune the duct assembly out of unwanted vibrational modes from natural frequencies or otherwise.

Yet another advantage of the above described aspects is by utilizing the electrodeposited processes described, a minimal thickness of the metallic layer for component integrity is predictable during forming, further ensuring conduit integrity without adding unnecessary mass, or bulk. Non-limiting aspects of the above described features can be utilized to reduce weight by an electrodeposited component by ten to fifteen percent. When designing aircraft components, important factors to address are size, weight, and reliability. The above described electrodeposited fluid conduit with preform body results in a lower weight, smaller sized, increased performance, and increased integrity system. Reduced weight and size correlate to competitive advantages during flight. Further still, the preform body can be created quickly and cheaply elsewhere if beneficial. The inclusion of the preformed bodies into the unitary monolithic duct body would eliminate or reduce stress risers associated with duct geometry, pressure loading, fatigue, attachment brackets, and other sources of load.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of forming a duct assembly, the method comprising:
   providing a preform body having an outer surface;
   disposing the preform body adjacent a sacrificial mandrel such that at least a portion of the preform body abuts an outer surface of the sacrificial mandrel;
   forming the duct assembly by depositing metal on the outer surface of the sacrificial mandrel and the preform body to define a unitary metallic tubular element with the preform body and where depositing metal occurs at a temperature that does not damage the sacrificial mandrel; and
   removing the sacrificial mandrel to define the duct assembly.

2. The method of claim 1, further comprising forming, via additive manufacturing or injection molding, the sacrificial mandrel having the outer surface with a predetermined geometry.

3. The method of claim 1 wherein the depositing metal includes electroforming.

4. The method of claim 1 wherein the preform body is a metal body including nickel, nickel alloy, or steel.

5. The method of claim 1 wherein providing the preform body further comprises forming the preform body.

6. The method of claim 5 wherein forming the preform body includes at least one of additively manufacturing the preform body, milling the preform body, casting the preform body, or machining the preform body.

7. The method of claim 1 wherein the preform body is at least one of a sleeve, a bracket, a ring, or a stress insert.

8. The method of claim 1 wherein the preform body includes at least one transitional surface on a side of the body that interfaces with the sacrificial mandrel.

9. The method of claim 1 wherein removing the sacrificial mandrel includes at least one of melting or dissolving the sacrificial mandrel.

10. The method of claim 1 wherein the preform body includes an aperture that the sacrificial mandrel is disposed within.

11. The method of claim 10 wherein the outer surface of the preform body is flush with the outer surface of the sacrificial mandrel.

12. The method of claim 1 wherein the outer surface of the preform body extends from the outer surface of the sacrificial mandrel.

13. The method of claim 1 wherein the depositing metal on the outer surface of the sacrificial mandrel and the preform body comprises fully enclosing an outer surface of the preform body.

14. The method of claim 1, further comprising identifying a high stress area of the metallic tubular element prior to disposing the preform body.

15. The method of claim 14 wherein identifying the high stress area includes identifying at least a portion of the metallic tubular element to experience higher stress compared with non-high stress portions of the metallic tubular element.

16. The method of claim 15 wherein disposing the preform body includes disposing the preform body relative to the sacrificial mandrel at a high stress area of the metallic tubular element.

17. The method of claim 16 wherein the metallic tubular element is better suited to resist failure due to at least one of vibration, stress, or thermal cycling as compared to a metallic tubular element without the preform body.

18. A method of forming a duct assembly for an aircraft engine, the method comprising:

forming a preform body with an interior surface and an exterior surface;

disposing the preform body adjacent a sacrificial mandrel such that at least a portion of the preform body abuts an outer surface of the mandrel;

forming the duct assembly by depositing metal on the outer surface of the sacrificial mandrel and the preform body;

removing the sacrificial mandrel to define the duct assembly; and attaching the duct assembly to the aircraft engine.

19. The method of claim 18, further comprising forming, via additive manufacturing or injection molding, the sacrificial mandrel having the outer surface with a predetermined geometry.

20. The method of claim 18 wherein the depositing metal includes electroforming.

21. The method of claim 18 wherein forming the preform body includes at least one of additively manufacturing the preform body, milling the preform body, casting the preform body, or machining the preform body.

22. A method of forming a duct, the method comprising:

disposing the a preform body adjacent a mandrel such that at least a portion of the preform body abuts an outer surface of the mandrel; forming the duct by depositing metal on the outer surface of the mandrel and the preform body to define a unitary metallic tubular element with the preform body whereby depositing metal occurs at a temperature that does not damage the mandrel; and removing the mandrel.

23. The method of claim 22, further comprising forming, via additive manufacturing or injection molding, the mandrel having the outer surface with a predetermined geometry.

* * * * *